United States Patent [19]

Itoh et al.

[11] Patent Number: 5,011,232
[45] Date of Patent: Apr. 30, 1991

[54] MOUNTING MECHANISM OF WHEEL CAP

[75] Inventors: Toshio Itoh; Yasuhide Narita, both of Aichi, Japan

[73] Assignee: Kabushiki Kaisha Tokai Denki Seisakusho, Aichi, Japan

[21] Appl. No.: 430,155

[22] Filed: Nov. 1, 1989

[30] Foreign Application Priority Data

Nov. 4, 1988 [JP] Japan .................. 63-144493[U]

[51] Int. Cl.⁵ .............................................. B60B 7/06
[52] U.S. Cl. ............................. 301/37 P; 301/37 PB
[58] Field of Search ............. 301/37 R, 37 P, 37 PB, 301/37 TP, 108 R, 108 A

[56] References Cited

FOREIGN PATENT DOCUMENTS 0271038 6/1988 European Pat. Off. ......... 301/37 P
3743301 7/1989 Fed. Rep. of Germany .... 301/37 R Primary Examiner—Russell D. Stormer

[57] ABSTRACT

A mounting mechanism of a wheel cap includes engaging claws arranged on a wheel cap body of the cap, a flexible ring arranged on the body while contacting with the inner side of each of the claws under pressure, a closing lid arranged on the body, and a projection arranged on the lid. The urging force of the ring applies on the radial inner surface of each claw. The lid is moved between a ring mounting position and a ring releasing position. The projection contacts with the free ends of the ring in the ring mounting position of the lid. Each claw engages with a hump portion of a disc wheel so that the cap is mounted on the disc wheel to be capable of being dismounted therefrom.

4 Claims, 2 Drawing Sheets

MOUNTING MECHANISM OF WHEEL CAP

BACKGROUND OF THE INVENTION

The present invention relates to a mounting mechanism of a wheel cap which can be mounted on and dismounted from a disc wheel.

Conventionally, there have been known various types of mounting mechanisms of wheel caps. For example, a known mounting mechanism of a wheel cap is constructed as follows; plural engaging claws are arranged at specified portions of the rear surface of a wheel cap body of the wheel cap, a flexible ring for pressing each claw outwardly in the radial direction of the ring is arranged on the inner sides of the claws in the radial direction on the rear surface of the body, and then the claws engage with the hump portion of a disc wheel so that the cap is mounted on the wheel to be capable of being dismounted therefrom.

In the conventional mechanism, however, the ring is arranged on the inner sides of the engaging claws while the outside diameter of the ring is forcedly reduced so that the urging force of the ring may be certainly applied on each claw. Therefore, the urging force of the ring becomes larger and then the large urging force thereof requires the larger mounting force and dismounting force when the cap is mounted on and dismounted from the disc wheel, resulting in complexity of the mounting and dismounting operations of the cap with respect to the disc wheel.

In order to resolve the problem, it can be considered that the urging force of the ring becomes smaller and then the smaller force thereof allows the mounting and dismounting operations of the cap with respect to the disc wheel to be easily performed. However, the smaller force of the ring causes the cap to drop from the disc wheel of a running automobile.

SUMMARY OF THE INVENTION

Accordingly, an essential object of the present invention is to provide a mounting mechanism of a wheel cap to resolve the problem by which a wheel cap can be easily mounted on and dismounted from a disc wheel and which can prevent the cap from dropping from the wheel of a running automobile.

In accomplishing these and other objects, according to one preferred embodiment of the present invention, there is provided a mounting mechanism of a wheel cap comprising: engaging claws arranged at specified portions of a rear surface of a wheel cap body of the cap; a flexible ring arranged on the rear surface of the body and on the inner side of each claw in a radial direction of the body and applying an urging force thereof on the inner surface of each claw while the ring contacts with the inner surface thereof under pressure, the force being urged to press the claws outwardly in a radial direction of the ring; a closing lid for moving between a ring mounting position and a ring releasing position; and a projection arranged on a rear surface of the lid and contacting with free ends of the ring in the ring mounting position of the lid, whereby the claws engage with a hump portion of a disc wheel so that the cap is mounted on the disc wheel to be capable of being dismounted therefrom.

By the above construction of the present invention, after the cap is mounted on the wheel, the lid is positioned at the mounting position so that both the free ends of the ring arranged on the inner sides of the claws on the rear surface of the body contact with the projection of the lid not to reduce the outside diameter of the ring, with the result that it may prevent the urging force of the ring from being reduced so that the specified urging force thereof applies on each claw. Therefore, the cap may be certainly mounted on the wheel, which may prevent the cap from dropping from the wheel of a running automobile.

On the other hand, when the cap is mounted on or dismounted from the wheel, the lid is moved from the mounting position to the releasing position, so that the projection is away from the free ends of the ring and out of contact therewith, resulting in free reduction of the outside diameter of the ring. Therefore, freely flexible bending of each claw of the cap allows the cap to be easily mounted on and dismounted from the wheel.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
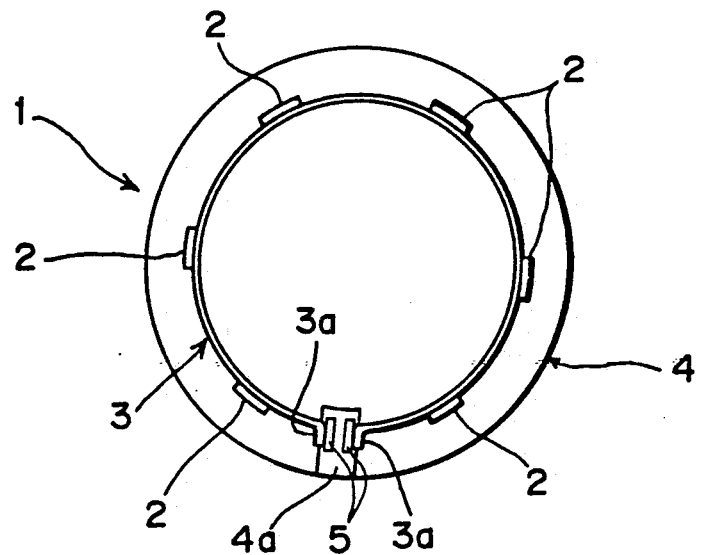
FIG. 1 is a general rear view of a wheel cap in a mounting mechanism of the wheel cap according to one preferred embodiment of the present invention.
Figure 2:
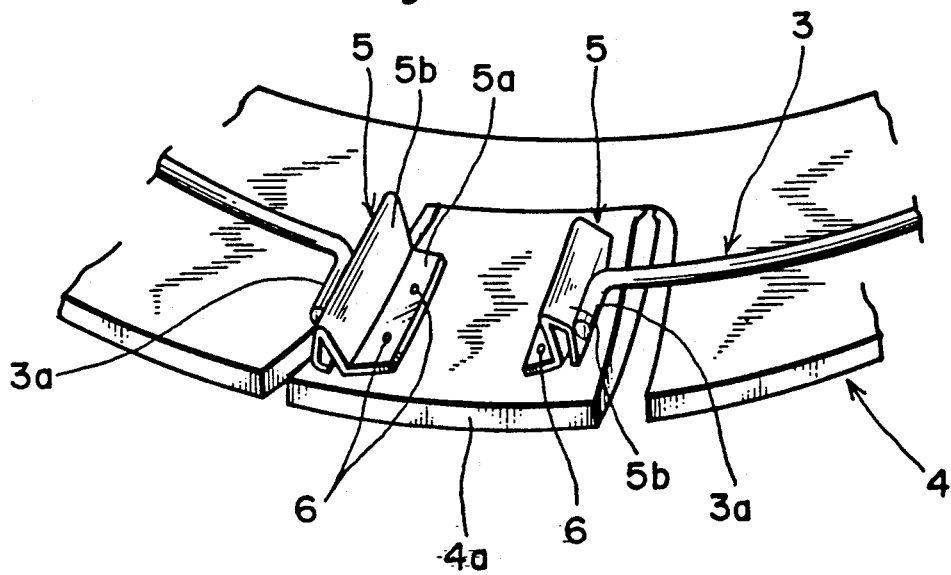
FIG. 2 is a partial perspective view of the cap.
Figure 3:
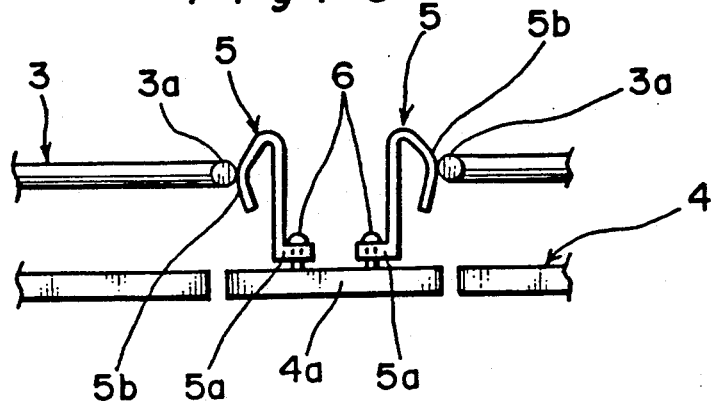
FIG. 3 is a partial bottom view of the cap showing relation between a closing lid and an urging ring.

Before the description of the present invention proceeds, it is to be noted that like parts are designated by like reference numerals throughout the accompanying drawings.

As shown in FIG. 1, a mounting mechanism of a wheel cap according to the embodiment of the present invention is constructed as follows. A flexible ring 3 is arranged on the rear surface of a wheel cap body 4 of the wheel cap 1 and on the inner sides of plural engaging claws 2 in the radial direction of the body 4. Free ends 3a of the ring 3 contact with projections 5 of a closing lid 4a of the body 4 in a closing position (flexible ring mounting position) with respect to the body 4.

On the body 4, the plural engaging claws 2 are arranged along the circumference of the body 4 at specified portions of the outer circumferential area of the rear surface thereof while each claw 2 is projected therefrom. Inside each claw 2, the ring 3 consisting of an approximately C-shaped wiring is arranged. The ring 3 contacts with the radial inner surface of each claw 2 to apply the urging force of the ring 3 on each claw 2. Thus, each claw 2 is in engagement with a hump portion of a disc wheel so that the cap 1 may be mounted on the disc wheel while being capable of being dismounted therefrom. Both the free ends 3a of the ring 3 are bent outwardly in the radial direction of the body 4. In this way, the ring 3 which has the free ends 3a formed by partially cutting the ring 3, instead of an endless ring, is used as the flexible ring, with the result that the radial dimension of the ring may be considerably varied so that the ring 3 may be easily mounted on the inner sides of the claws 2.

The closing lid 4a is arranged between the specified pair of the claws 2 of the plural claws 2 arranged at the outer circumferential area of the body 4. The lid 4a is connected with the body 4 by any suitable means so as to be capable of outwardly opening and closing with respect to the body 4. By clicking engaging means (not shown), the lid 4a is moved between the closing position as the mounting position for mounting the ring 3 where the front surface of the body 4 is generally coincident with the front surface of the lid 4a, and an opening position as a releasing position for releasing the ring 3 where the lid 4a is outwardly opened with respect to the front surface of the body 4. The lid 4a may be specially attached to the body 4 for mounting the ring 3. Furthermore, the lid 4a may be provided with such function for a valve cap of a tire (not shown) that the valve of the tire is exploded from the wheel cap when the wheel cap is mounted on the disc wheel in the opening position of the lid 4a.

On the rear surface of the lid 4a, a pair of projections 5 are arranged. Each projection 5 consists of, for example, a flat spring and has a fixed portion 5a fixed to the rear surface of the lid 4a by screws 6 and a bending portion 5b upwardly projected and bent from the fixed portion 5a to form a reversed J-shape. The free end 3a of the ring 3 contacts with the bending portion 5b to slightly and flexibly bend the bending portion 5b, whereby a bias force of the bending portion 5b applies on the ring 3 in the circumferential direction of the ring 3. By this bias force, the ring 3 is urged to become larger in the radial dimension thereof to act the urging force on the inner surface of each claw 2. If necessary, adjustment of the shape of the bending portion 5b of the projection 5 and the position of the fixed portion 5a with respect to the lid 4a causes the urging force applying on the ring 3 to be adjusted, with the result that the urging force acting on each claw 2 through the ring 3 may be adjusted.

According to the arrangement, firstly, the lid 4a is positioned at the opening position with respect to the body 4. Then, both the free ends 3a of the ring 3 arranged on the inner sides of the plural claws 2 of the body 4 are confronted with the lid 4a, so that each free end 3a of the ring 3 is arranged to be capable of contacting with the projection 5 of the lid 4a.

Then, in the case where the cap 1 is mounted on the wheel, the lid 4a is positioned at the opening position, so that the cap 1 presses the wheel and thus each claw 2 of the cap 1 is flexibly bent to engage with the wheel. That is, each free end 3a of the ring 3 is away from each projection 5, with the result that each claw 2 is flexibly bent and both the free ends 3a of the ring 3 are approach to each other. Thus, reduction in the outside diameter of the ring 3 on the surface of the cap 1 causes the ring urging force applied on the claws 2 to be reduced, with the result that the cap 1 may be easily mounted on the wheel.

On the other hand, in the case where the cap 1 is mounted on the wheel, the lid 4a is moved from the opening position to the closing position with respect to the body 4, so that the projections 5 of the lid 4a are forcedly inserted between both the free ends 3a of the ring 3. Then, the projections 5 contact with both the free ends 3a of the ring 3, respectively. Therefore, the urging force which acts on both the free ends 3a of the ring 3 in the circumferential direction of the ring 3 by the contact of the projections 5 does not allow the outside diameter of the ring 3 to be reduced by the approach of both the free ends 3a of the ring 3. Then, the urging force acting on the claws 2 can not be reduced, while the urging force acting on the claws 2 after mounting of the cap 1 is larger than the force in mounting or dismounting of the cap 1. Thus, it is difficult for each claw 2 to be disengaged from the wheel so that the cap 1 is securely mounted on the wheel.

When the cap 1 is dismounted from the wheel, similarly to the mounting, the lid 4a is moved from the closing position to the opening position so that the outside diameter of the ring 3 can be freely reduced. Each claw 2 can be disengaged from the wheel and then the cap 1 is easily dismounted from the wheel. In the case where the lid 4a is not positioned at the opening position of the lid 4a, it is possible that the cap 1 is forcedly dismounted from the wheel, but the operation is more difficult than the foregoing operation.

According to the embodiment, after the cap 1 is mounted on the wheel, the lid 4a is positioned at the mounting position so that both the free ends 3a of the ring 3 arranged on the inner sides of the claws 2 on the rear surface of the body 4 contact with the projections 5 of the lid 4a not to reduce the outside diameter of the ring 3, with the result that it can prevent the urging force of the ring 3 from being reduced so that the specified urging force thereof applies on each claw 2. Therefore, the cap 1 may be certainly mounted on the wheel, and it may prevent the cap 1 from dropping from the wheel of a running automobile.

On the other hand, when the cap 1 is mounted on or dismounted from the wheel, the lid 4a is moved from the closing position to the opening position, so that the projections 5 are away from the free ends 3a of the ring 3 and out of contact therewith, resulting in free reduction of the outside diameter of the ring 3. Therefore, freely flexible bending of each claw 2 of the cap 1 allows the cap 1 to be easily mounted on and dismounted from the wheel.

In the closing position of the lid 4a where the projections 5 contact with the free ends 3a of the ring 3, the projections 5 allow the bias force thereof to apply on the free ends 3a of the ring 3 in the circumferential direction of the ring 3 so that the outside diameter of the ring 3 after being mounted on the body 4 is larger than that of the ring 3 before being mounted thereon. Thus, the urging force of the ring 3 on which the bias force of the projection 5 applies acts on each claw 2 so that the condition where the cap 1 is mounted on the wheel can be certainly maintained.

Figure 4:
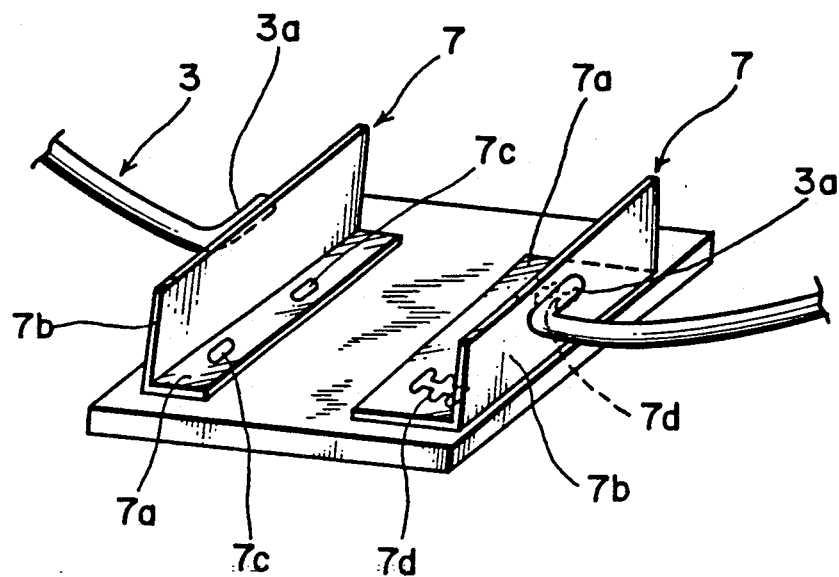
FIGS. 4 through 6 are a partial perspective view of a wheel cap according to another embodiment of the present invention, a plan view of a projection shown in FIG. 4, and a plan view of a mounting hole of the projection.
Figure 5:
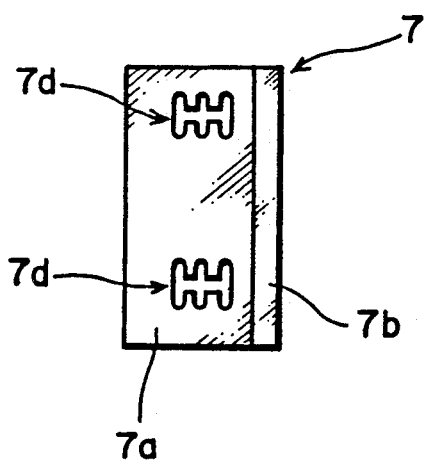
Figure 6:
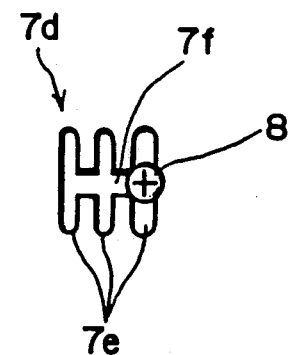

The present invention is not limited to the embodiment described above; it can be put in the practice in other various forms. For example, the projection 5 may consist of a plate so that the bias force thereof is unable to apply on the ring 3. That is, as shown in FIGS. 4 to 6, each of two projections 7 consists of a rectangular plate which is bent to form a fixed portion 7a and a contact portion 7b projecting from the fixed portion 7a. Each fixed portion 7a thereof is fixed on the rear surface of the lid 4a by screws 8, while each contact portion 7b thereof contacts with each free end 3a of the ring 3. One of the projections 7 has two mounting holes 7c consisting of screwed holes at the fixed portion 7a thereof. The other of the projections 7 has at the fixed portion 7a thereof mounting holes 7d each consisting of three longitudinal slots 7e and a transverse slot 7f extending to intersect the longitudinal slots 7e, as shown in FIG. 6.

Movement of each screw 8 in the slots 7e and 7f in each hole 7d allows the other of the projections 7 to be adjustably attached to the lid 4a, with the result that contact adjustment between the free ends 3a of the ring 3 and the projections 7 may be carried out. Thus, adjustment of the urging force of the ring 3 which applies on each claw 2 may be suitably carried out in correspondence with dimensional errors of the outside diameter of the ring 3 and the diameter of the cap 1. If the position of the other of the projections 7 is adjusted in large extent with respect to the lid 4a, the ring 3 with the same outside diameter may be applied to wheel cap bodies with various diameters by the positional adjustment of the projections 7 with respect to the lid 4a.

The present invention is not limited to the embodiment where a pair of projections are arranged on the lid 4a, but only one projection of the pair of projections is arranged on the lid 4a to contact with the free ends 3a of the ring 3.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A mounting mechanism of a wheel cap comprising:
   engaging claws arranged at specified portions of a rear surface of a wheel cap body of the cap;
   a flexible ring arranged on the rear surface of the body and on the inner side of each claw in a radial direction of the body for applying an urging force thereof on the inner surface of each claw while said ring contacts with the inner surface thereof under pressure, said claws being outwardly pressed in a radial direction of said ring by the urging force;
   a closing lid for moving between a ring engaging position where said lid closes into engagement with free ends of said ring and a ring releasing position where said lid is away from the free ends of said ring; and
   a projection arranged on a rear surface of said lid and contacting with free ends of said ring in the ring engaging position of said lid so that said projection maintains the urging force on said flexible ring in the engaging position
   whereby said claws engage with a hump portion of a disc wheel so that the cap is mounted on the disc wheel to be capable of being dismounted therefrom.

2. A mounting mechanism of a wheel cap as claimed in claim 1, wherein said lid functions as a valve cover for a valve sealing cap of a tire.

3. A mounting mechanism of a wheel cap is claimed in claim 1, wherein said projection comprises a spring member, one end of which is fixed to the rear surface of said lid and the other end of which is capable of bending with respect to the fixed end of the spring member and coming in contact with the free end of said ring, and allows a bias force thereof to act on the free ends of said ring in a circumferential direction of said ring with which said projection contacts.

4. A mounting mechanism of a wheel cap as claimed in claim 2, wherein said projection comprises a spring member, one end of which is fixed to the rear surface of said lid and the other end of which is capable of bending with respect to the fixed end of the spring member and coming in contact with the free end of said ring, and allows a bias force thereof to act on the free ends of said ring in a circumferential direction of said ring with which said projection contacts.

* * * * *